No. 886,240. PATENTED APR. 28, 1908.
C. R. NEWTON.
COUPLING FOR PERCUSSIVE APPARATUS.
APPLICATION FILED SEPT. 24, 1906.

Witnesses:

Inventors;
Charles Rembrandt Newton
by Chas Ovendale
Attorney

UNITED STATES PATENT OFFICE.

CHARLES REMBRANDT NEWTON, OF EAST RAND, TRANSVAAL.

COUPLING FOR PERCUSSIVE APPARATUS.

No. 886,240.  Specification of Letters Patent.  Patented April 28, 1908.

Application filed September 24, 1906. Serial No. 336,032.

*To all whom it may concern:*

Be it known that I, CHARLES REMBRANDT NEWTON, a subject of the King of Great Britain, and resident of East Rand, Transvaal, have invented certain new and useful Improvements in Couplings for Percussive Apparatus, of which the following is a specification.

This invention relates to couplings or means for connecting together the parts of percussive apparatus or machines. It is applicable for use in percussive rock-drilling machines for securing the drilling or boring bit in the chuck or tool holder. Employed for this purpose the invention provides a simple and efficient device and one which permits the drilling bit or boring tool to be removed and renewed as is required in the operation of the machine, with greater facility than the present forms of chucks.

Figure 2:
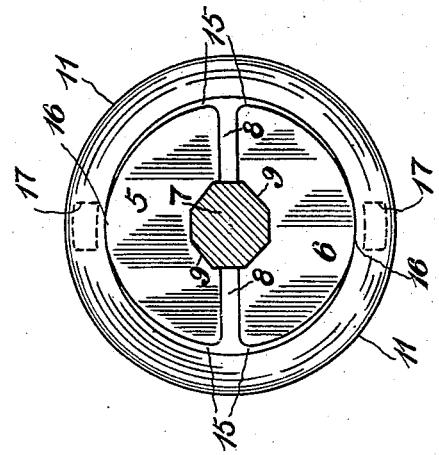
Figure 1:
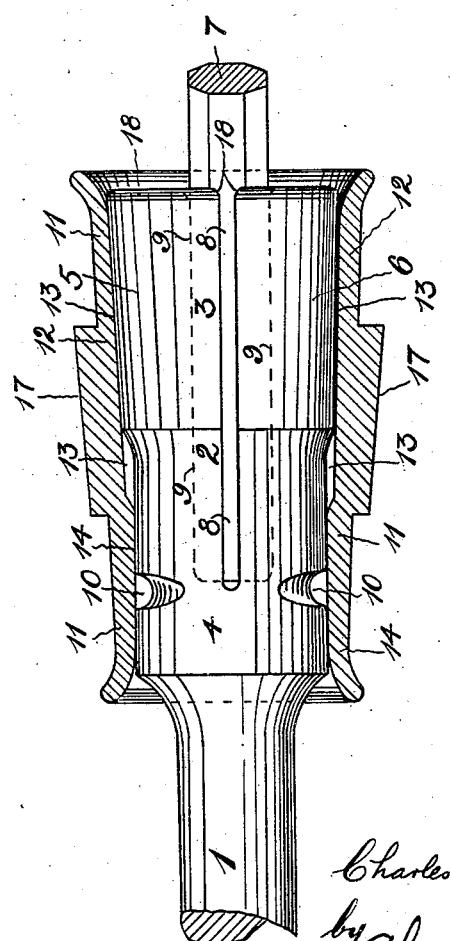

The invention will be more fully described by aid of the accompanying drawings, in which Figure 1 represents the chuck or tool holder of a rock-drilling machine in longitudinal part sectional elevation with the drill or bit secured therein. Fig. 2 is a front elevation of Fig. 1.

In the drawings, 1 represents the piston rod, on the forward extremity of which is formed the head or enlargement 2 which forms the tool holder. The front portion 3 of the head is made of substantially conical configuration, tapering rearwardly, and the rear portion 4 of the head is made preferably cylindrical. The head 2 is for the greater portion of its length cut into two parts or segments 5, 6, which form the gripping pieces or jaws between which the drill bit or tool 7 is clamped and secured. The forward rearwardly tapering portion 3 of the head is made slightly elliptical in transverse section, the diameter across the sawcut or slit 8 being slightly less than the diameter at right-angles to the saw-cut 8.

In the plane of the saw-cut 8 and between the two segments 5, 6, is formed a hole 9 which is adapted to receive the shank or end of the drill bit or tool 7. The hole 9 may be of the same shape as the shank of the tool 7 (the hole 9 and shank are both shown octagonal in the drawing) or if the end of the tool 7 is shanked or rounded the hole 9 may be made of corresponding shape. The hole 9 extends rearwardly the full length of the segments 5, 6. It may terminate in front of the rear end of the saw-cut 8 or may be extended beyond the latter any desired further distance into the rear portion 4 of the head.

In the circumference of the part 4 of the head are formed grooves 10. These grooves 10 are diametrically opposite and at right-angles to the plane of the saw-cut 8 and are placed at or in proximity to the rear ends of the segments 5, 6, or end of the saw-cut 8, so that they render said segments the more resilient.

Surrounding the head 2 is a sleeve 11, the ends of which are preferably flared or made slightly bell-mouthed. The bore of the front portion 12 of the sleeve is conical as indicated at 13, and the rear portion 14 cylindrical, to correspond to the parts 3, 4, of the head. The elliptical cross section imparted to the front portion 3 of the head provides clearance as indicated at 15 in Fig. 2, and insures contact being made between the sleeve 11 and said portion 3 at right angles to the saw-cut 8, as indicated at 16 in Fig. 2. This allows the segments 5, 6, to close to secure the bit or tool 7 and prevents their binding along the sides adjacent to the saw-cut 8. The cylindrical portion of the bore of the sleeve 11 slides on the rear cylindrical part 4 of the head, and the front conically bored part of the sleeve slides on the conical portion 3 of the segments 5, 6. The sleeve is shown constructed with lugs 17 adapted to be hit by a hammer or the like for sliding the sleeve longitudinally of the head in either direction to renew the drills or tools, or for any other purpose. The sleeve 11 is preferably so constructed that it projects beyond the front end of the head 2, as shown in Fig. 1, so that should the drill be fed too far forward it will serve to protect the head by preventing it coming into contact with the rock, and so obviate its being distorted. For the same purpose the edges of the segments 5, 6, at the front, may be rounded as indicated at 18 in Fig. 1.

In using the chuck the tool 7 is projected to the bottom of the hole 9 and the sleeve 11 then moved forward by striking the rear ends of the lugs 17. This causes the sleeve to slide forward and compresses the segments round the end of the drill 7. By constructing the rear portion 4 of the head cylindrical, it will be understood that the front portions of the segments 5, 6, between them grip the tool or drill 7. By moving the sleeve 11 in the opposite direction the segments 5, 6, open and permit the tool to be easily withdrawn. By tapering the front portion 3 of the head in a rearward direction it will be perceived that every blow of the tool 7 on the rock tends to drive the sleeve 11 forward on the head and thereby more securely fix the tool.

What I claim as my invention and desire to protect by Letters Patent is:—

1. In a coupling device for percussive apparatus, in combination, a reciprocating part formed with a head, the latter made cylindrical in its rear portion and conical in its front portion, the front portion being made of elliptical cross section, a central hole in the head for the reception of the piece to be secured thereto, the head being flexibly segmented round said hole, and a surrounding sleeve having diametrically opposite external projections, said sleeve being flared at both ends and shaped to fit the cylindrical and conical rear and front portions of the head for forcing the segments together.

2. In a coupling device for percussive apparatus, in combination, a reciprocating part formed with a head, the latter being made cylindrical in its rear portion and conical in its front portion, the front portion being also made of elliptical cross section, the head being split in halves for the greater portion of its length and having a hole between the halves for the reception of the piece to be fixed to the head, grooves in the cylindrical rear portion of the head at the rear ends of the segments for increasing the resiliency of the latter, and a sleeve surrounding the head having diametrically opposite external projections, said sleeve being flared at both ends and shaped to fit the rear cylindrical and front conical portions so as to cause the externally coned portions of the segments to grip the piece to be fixed, as set forth.

In witness whereof I have hereunto set my hand in the presence of two subscribing witnesses.

CHARLES REMBRANDT NEWTON.

Witnesses:
   CHAS. OBENDALE,
   R. OBENDALE.